United States Patent Office 2,750,381
Patented June 12, 1956

2,750,381

STEROID ALKALI-METAL ENOLATES

John A. Hogg, Kalamazoo Township, Kalamazoo County, and William P. Schneider, Kalamazoo, Mich., assignors to The Upjohn Company, Kalamazoo, Mich., a corporation of Michigan No Drawing. Application August 21, 1952,
Serial No. 305,705

10 Claims. (Cl. 260—239.55)

The present invention relates to certain steroid enols and metal enolates thereof and is more particularly concerned with 21-alkoxyoxalyl-3-hydroxy- and 21-alkoxyoxalyl-3-acyloxy-16,17-oxido-5-pregnene-20-one and alkali-metal enolates thereof.

The novel compounds of the present invention may be represented in their keto form by the following structural formula:

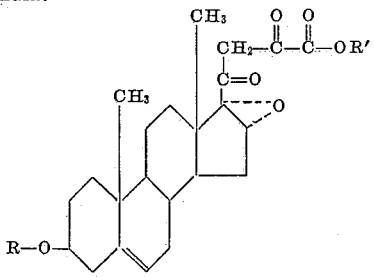

and alkali-metal enolates thereof, represented by the following structural formula:

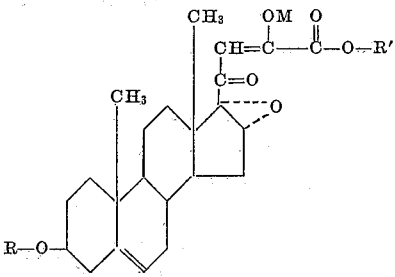

wherein in the formulae R is hydrogen or an acyl group, R' is an alkyl group, M is an alkali metal and the R—O— group has either the alpha or beta stereoconfiguration.

The process of the present invention involves condensation of 3-hydroxy- or 3-acyloxy-16,17-oxido-5-pregnene-20-one with an alkyl di-ester of oxalic acid in the presence of an alkali-metal base to produce 21-alkoxyoxalyl-3-hydroxy- or 21-alkoxyoxalyl-3-acyloxy-16,17-oxido-5-pregnene-20-one alkali-metal enolate. Treatment with acid produces the free enols, 21-alkoxyoxalyl-3-hydroxy- or 21-alkoxyoxalyl-3-acyloxy-16,17-oxido-5-pregnene-20-one.

An object of the present invention is to provide novel 21-alkoxyloxalyl-3-hydroxy- and 21-alkoxyoxalyl-3-acyloxy-16,17-oxido-5-pregnene-20-one and the alkali-metal enolates thereof. Other objects of the present invention will be apparent to those skilled in the art to which this invention pertains.

The novel compounds of the present invention have utility as stable forms of the corresponding keto acids, keeping well, as convenient solids, for long periods of storage. Their water solubility makes these compounds readily adaptable for further syntheses, to reactions employing aqueous media. The corresponding enols, the acids which can readily be obtained by hydrolysis thereof, and the 21-acyloxy-3-hydroxy- and 3,21-diacyloxy-16,17-oxido-5-pregnene-20-one compounds, as shown in Example 1A, 1B and 1C, furnish valuable intermediates for the preparation of Reichstein's compound S (11-desoxy-17α-hydroxycorticosterone) and for the physiologically active substance Kendall's compound F (17α-hydroxycorticosterone) as well as for other steroid compounds having the characteristic dihydroxyacetone side-chain or the like. Reichstein's compound S, for example, is obtained by known methods [Julian et al., J. Am. Chem. Soc., 72, 5145 (1950)] from 21-acyloxy-3β-hydroxy-16,17-oxido-5-pregnene-20-one, prepared from the compounds of the invention as indicated in Example 1B. Kendall's compound F is obtained from Reichstein's compound S by a known process [Colingsworth et al., J. Am. Chem. Soc., 74, 2381 (1952)].

The novel compounds of the present invention which are of particular interest are those compounds having the above generic formula, wherein R is hydrogen or an acyl radical of a hydrocarbon carboxylic acid, preferably such acid containing up to eight carbon atoms, inclusive, and R' is an alkyl radical, preferably a lower-alkyl radical containing up to eight carbon atoms, inclusive, and the alkali-metal enolates thereof.

The starting compounds of the present invention are known 3β-hydroxy-16,17-oxido-5-pregnene-20-one [Julian et al., J. Am. Chem. Soc., 72, 5145 (1950)] and the 3β-acyloxy-16,17-oxido-5-pregnene-20-one prepared by esterification of the former compounds, such as treatment of 3β-hydroxy-16,17-oxido-5-pregnene-20-one with acid anhydrides or acyl chlorides in pyridine.

The configuration of the group at carbon atom three of the starting material does not influence the course of the reaction in the present invention. Starting compounds with either an α- or β-configuration of the hydroxy or acyloxy group at carbon atom three are equally operative. Since no change in configuration at carbon atom three takes place under the conditions of reaction, the configuration of the product is dependent on the starting material employed.

In carrying out the process of the present invention, a 3-hydroxy- or 3-acyloxy-16,17-oxido-5-pregnene-20-one is usually dissolved in the alkanol corresponding to the alkanol which is used in the formation of the selected starting ester of oxalic acid, or in a solvent which is non-reactive under the conditions of reaction, such as, for example, benzene or ether, and mixed with the selected alkyl di-ester of oxalic acid in the presence of an alkali-metal base. The di-esters of oxalic acid which are preferred in the method of the present invention are lower-alkyl esters containing from one to eight carbon atoms, inclusive. Of these the methyl and ethyl esters are preferred. Alkali-metal bases which may be used include the alkali-metal alkoxides, the alkali metals, the alkali-metal hydrides, sodium amide, triphenylmethyl sodium, and others. Of these the sodium and potassum alkoxides are preferred. The selected alkali-metal base catalyzes the condensation of the alkyl di-ester of oxalic acid with the 3-hydroxy- or 3-acyloxy-16,17-oxido-5-pregnene-20-one and contributes the alkali-metal moiety to the alkali-metal enolate. The alkali-metal alkoxide may be used solvent-free, dissolved or suspended in a non-reactive solvent, or in situ in the alkanol in which said alkali-metal alkoxide is formed. When potassium is used, it is usually used as the solution formed by its reaction with tertiary butyl alcohol according to procedure well known in the art.

The resulting reaction mixture is then allowed to stand at a temperature between about zero degrees centigrade and the boiling point of the reaction mixture, preferably at room temperature, for a period of between about one-half hour and about ninety-six hours, usually about one to four hours.

The thus-produced alkali-metal enolate may be separated by the addition of a large volume of an organic solvent in which the alkali-metal enolate is insoluble, such as, for example, ether, petroleum ether, hexane hydrocarbons and the like. The thus-recovered 21-alkoxy-oxalyl-3-hydroxy- or 21-alkoxyoxalyl-3-acyloxy-16,17-oxido-5-pregnene-20-one alkali-metal enolate is usually obtained as an amorphous stable solid. Alternatively, it may be used, without isolation, as an intermediate in the synthesis of the corresponding 21-glyoxalic acid, or as an intermediate for the introduction of a 21-hydroxy- or 21-acyloxy group into 3-hydroxy- or 3-acyloxy-16,17-oxido-5-pregnene-20-one as described in procedures A and B of Example 1, or as the free enol by treatment of the alkali-metal enolate with dilute acid, such as hydrochloric acid, sulfuric acid or the like, as described in procedure C of Example 1.

The following examples are given to illustrate the process and products of the present invention and are not to be construed as limiting.

*Example 1.—Sodium enolate of 21-ethoxyoxalyl-3β-acetoxy-16,17-oxido-5-pregnene-20-one*

A mixture of 0.59 grams of dry sodium methoxide, twenty milliliters of anhydrous benzene and 2.7 milliliters of ethyl oxalate were stirred until a clear solution was obtained and a solution of 3.72 grams (0.010 mole) of 3β-acetoxy-16,17-oxido-5-pregnene-20-one in 75 milliliters of anhydrous benzene was rapidly added with stirring. Stirring was continued for three hours at room temperature, then 250 milliliters of dry ether was added and the mixture was stirred for an additional 45 minutes. The ivory colored sodium enolate of 21-ethoxyoxalyl-3β-acetoxy-16,17-oxido-5-pregnene-20-one thus-precipitated was filtered, washed with ether and dried in a vacuum desiccator at reduced pressure. A quantitative yield was obtained; melting point 268–275 degrees centigrade. The presence of a sodium enolate in the structure was verified by the extreme solubility of the product in water and by a positive ferric chloride test for enols as exhibited by the formation of a bright red color when the product was dissolved in aqueous and alcoholic solutions of ferric chloride. The theoretical structure was further verified by infrared and ultra-violet absorption spectra.

A. 21-GLYOXALIC ACID OF 3β-ACETOXY-16,17-OXIDO-5-PREGNENE-20-ONE

Five hundred milligrams of the sodium enolate of 21-ethoxyoxalyl-3β-acetoxy-16,17-oxido-5-pregnene-20-one, obtained above, was dissolved in a solution of seventy milligrams of potassium hydroxide in fifteen milliliters of a solution composed of equal parts of water and alcohol, whereafter the whole was heated for fifteen minutes on a steam bath. The cooled solution was then filtered and upon acidification there was slowly deposited a crystalline precipitate of the 21-glyoxalic acid of 3β-acetoxy-16,17-oxido-5-pregnene-20-one. Infrared analysis of said compound in solution (chloroform) verified the theoretical structure.

B. 3β,21-DIACETOXY-16,17-OXIDO-5-PREGNENE-20-ONE

To a solution of 1.992 grams (0.004 mole) of the sodium salt of 21-ethoxyoxalyl-3β-acetoxy-16,17-oxido-5-pregnene-20-one dissolved in 25 milliliters of methanol and cooled in an ice-bath was added dropwise, with stirring, over a period of approximately one hour, a solution of 1.05 grams (0.004 mole) of iodine dissolved in forty milliliters of methanol while maintaining the reaction temperature between minus fifteen and minus twenty degrees centigrade. The reaction mixture thus-produced was stirred for eighty minutes at a temperature of about minus fifteen degrees centigrade, whereafter 1.2 milliliters of a 3.4 N methanolic sodium methoxide solution was added thereto. Stirring was continued at zero degrees centigrade for one hour and the thus-produced 3β-acetoxy-21-iodo-16,17-oxido-5-pregnene-20-one was precipitated by the dropwise addition of 150 milliliters of water to the reaction mixture while maintaining the reaction temperature at zero degrees centigrade for the hour required to complete the addition. Twenty grams of sodium chloride was then dissolved in the reaction mixture and the product filtered, washed with water, and dried in a vacuum desiccator. The thus-isolated 3β-acetoxy-21-iodo-16,17-oxido-5-pregnene-20-one was converted without further purification to 3β,21-diacetoxy-16,17-oxido-5-pregnene-20-one as shown below.

To a freshly prepared mixture composed of twenty grams of potassium bicarbonate, twelve grams of glacial acetic acid and ten milliliters of acetone was added the 3β-acetoxy-21-iodo-16,17-oxido-5-pregnene-20-one obtained above dissolved in 100 milliliters of acetone. The mixture was heated under refluxing conditions for one hour whereafter the mixture was kept at room temperature for 2.5 days. The inorganic solids were removed by filtration and washed with 25 milliliters of acetone. The filtrate and wash were combined and the acetone removed by evaporation. The residue was extracted with three fifty-milliliter portions of warm ethyl acetate which were then combined, washed with a dilute sodium thiosulfate solution and water, and finally dried over anhydrous sodium sulfate. The dry ethyl acetate was distilled in vacuo and the residue was dissolved in a small portion of benzene and chromatographed over 85 grams of 60–100 mesh Florisil (synthetic magnesium silicate). The column was developed with 100-milliliter portions of solvent of the following composition and order: benzene, seven portions Skelly Solve B (hexane hydrocarbons) plus five percent acetone, four portions of Skelly Solve B plus ten percent acetone, eight portions of Skelly Solve B plus fifteen percent acetone, eight portions of Skelly Solve B plus twenty percent acetone, and one portion each of Skelly Solve B plus fifty percent acetone and acetone. The first five portions of Skelly Solve B plus twenty percent acetone eluates were combined and the solvent evaporated. Infrared analysis confirmed the structure of the 3β,21-diacetoxy-16,17-oxido-5-pregnene-20-one thus obtained.

C. 21-ETHOXYOXALYL-3β-ACETOXY-16,17-OXIDO-5-PREGNENE-20-ONE

Five hundred milligrams of the sodium enolate of 21-ethoxyoxalyl-3β-acetoxy-16,17-oxido-5-pregnene-20-one were dissolved and suspended in twenty milliliters of water. Ten milliliters of ten percent hydrochloric acid were added and the precipitate which separated collected on filter paper, washed with water and dried in a vacuum desiccator over Drierite (anhydrous calcium sulfate). Infrared analysis confirmed the structure of the 21-ethoxyoxalyl-3β-acetoxy-16,17-oxido-5-pregnene-20-one.

*Example 2.—Sodium enolate of 21-methoxyoxalyl-3β-acetoxy-16,17-oxido-5-pregnene-20-one*

Using essentially the procedure described in Example 1, 3β-acetoxy-16,17-oxido-5-pregnene-20-one is converted to the sodium enolate of 21-methoxyoxalyl-3β-acetoxy-16,17-oxido-5-pregnene-20-one by reaction with methyl oxalate and sodium in absolute methanol. The resulting sodium enolate is converted, as with the 21-ethoxyoxalyl compound, to the 21-glyoxalic acid of 3β-acetoxy-16,17-oxido-5-pregnene-20-one, 3β,21 - diacetoxy-16,17-oxido-5-pregnene-20-one and 21-methoxyoxalyl - 3β - acetoxy-16,17-oxido-5-pregnene-20-one according to the procedure of Examples 1A, 1B and 1C.

*Example 3.—Sodium enolate of 21-methoxyoxalyl-3β-propionyloxy-16,17-oxido-5-pregnene-20-one*

Using essentially the procedure described in Example 1, 3β-propionyloxy-16,17-oxido-5-pregnene-20-one is converted to the sodium enolate of 21-methoxyoxalyl-3β-propionyloxy-16,17-oxido-5-pregnene-20-one by reaction with methyl oxalate and sodium in absolute methanol. The resulting sodium enolate is converted, as with the 3β-acetoxy compound, to the 21-glyoxalic acid of 3β-propionyloxy-16,17-oxido-5-pregnene-20-one, 21-acetoxy-3β-propionyloxy - 16,17 - oxido-5-pregnene-20-one and 21-methoxyoxalyl-3β-propionyloxy-16,17-oxido-5 - pregnene-20-one according to the procedure of Examples 1A, 1B and 1C.

*Example 4.—Potassium enolate of 21-ethoxyoxalyl-3β-acetoxy-16,17-oxido-5-pregnene-20-one*

Using essentially the procedure described in Example 1, 3β-acetoxy-16,17-oxido-5-pregnene-20-one is converted to the potassium enolate of 21-ethoxyoxalyl-3β-acetoxy-16,17-oxido-5-pregnene-20-one by reaction with ethyl oxalate and potassium in tertiary butyl alcohol. The resulting potassium enolate is converted, as with the corresponding sodium enolate, to the 21-glyoxalic acid of 3β-acetoxy-16,17-oxido-5-pregnene-20-one, 3β-diacetoxy-16,17-oxido-5-pregene-20-one and 21-ethoxyoxalyl-3β-acetoxy-16,17-oxido-5-pregnene-20-one according to the procedure of Examples 1A, 1B and C.

*Example 5.—Sodium enolate of 21-ethoxyoxalyl-3α-hydroxy-16,17-oxido-5-pregnene-20-one*

Using essentially the procedure described in Example 1, 3α - hydroxy - 16,17 - oxido - 5 - pregnene - 20 - one is converted to the sodium enolate of 21-ethoxyoxalyl-3α-hydroxy-16,17-oxido-5-pregnene-20-one by reaction with ethyl oxalate and sodium amide in benzene.

*Example 6.—Sodium enolate of 21-ethoxyoxalyl-3β-hydroxy-16,17-oxido-5-pregnene-20-one*

In the same manner as described in Example 1, 3β-hydroxy, 16,17-oxido-5-pregnene-20-one is converted to the sodium enolate of 21-ethoxyoxalyl-3β-hydroxy-16,17-oxido-5-pregnene-20-one by reaction with ethyl oxalate and sodium ethoxide in ethyl alcohol.

In a manner substantially identical with that of Examples 1 through 6, the following compounds are prepared by reaction of the selected 3-hydroxy- or 3-acyloxy-16,17-oxido-5-pregnene-20-one with the appropriate alkyl oxalate and sodium or potassium alkoxide in an alkanol or non-reactive solvent medium: sodium enolate of 21-propoxyoxalyl - 3β - hydroxy - 16,17 - oxido - 5 - pregnene-20-one, sodium enolate of 21-butoxyoxalyl-3β-hydroxy-16,17-oxido-5-pregnene-20-one, sodium enolate of 21 - amyloxyoxalyl - 3β - hydroxy - 16,17 - oxido - 5-pregnene-20-one, sodium enolate of 21-hexyloxyoxalyl-3β - hydroxy - 16,17 - oxido - 5 - pregnene - 20 - one, sodium enolate of 21 - heptyloxyoxalyl - 3β - hydroxy-16,17-oxido-5-pregnene-20-one, sodium enolate of 21-octyloxyoxalyl - 3β - hydroxy - 16,17 - oxido - 5 - pregnene-20-one, the potassium analogues of these and like compounds and specifically the esters of the 3-alcohols above, such as the formate, acetate, propionate, butyrate and isobutyrate, valerate and isovalerate, caproate, oenanthylate, caprylate and benzoate, and similar related compounds.

It is to be understood that the invention is not to be limited to the exact details or exact compounds shown and described as obvious modifications and equivalents will be apparent to one skilled in the art, and the invention is therefore to be limited only by the scope of the appended claims.

We claim:
1. A compound selected from the group consisting of (1) 21 - lower - alkoxyoxalyl - 3 - hydroxy - 16,17-oxido - 5 - pregnene - 20 - one, represented by the following formula:

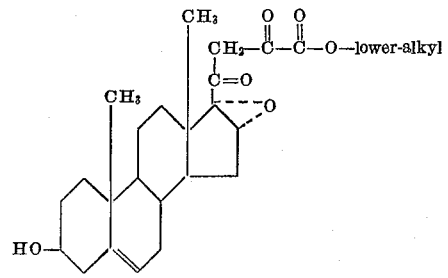

(2) alkali-metal enolate thereof, (3) 21-lower-alkoxyoxalyl - 3 - acyloxy - 16,17 - oxido - 5 - pregnene - 20-one, represented by the following formula:

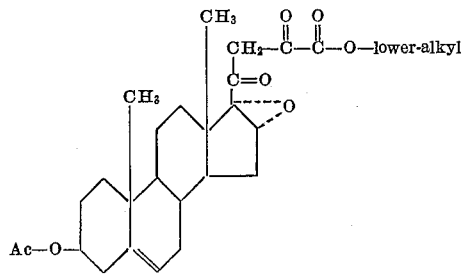

wherein Ac is the acyl radical of a hydrocarbon carboxylic avid containing from one to eight carbon atoms, inclusive, and (4) alkali-metal enolate thereof.

2. The sodium enolate of 21-lower-alkoxyoxalyl-3-hydroxy-16,17-oxido-5-pregnene-20-one.

3. The potassium enolate of 21-lower-alkoxyoxalyl-3-hydroxy-16,17-oxido-5-pregnene-20-one.

4. The sodium enolate of 21-lower-alkoxyoxalyl-3-acyloxy-16,17-oxido-5-pregnene-20-one, wherein the acyloxy group is of the formula AcO, Ac being the radical of a hydrocarbon carboxylic acid containing from one to eight carbon atoms, inclusive.

5. The potassium enolate of 21-lower-alkoxyoxalyl-3-acyloxy-16,17-oxido-5-pregnene-20-one, wherein the acyloxy group is of the formula AcO, Ac being the radical of a hydrocarbon carboxylic acid containing from one to eight carbon atoms, inclusive.

6. The sodium enolate of 21-methoxyoxalyl-3β-acetoxy-16,17-oxido-5-pregnene-20-one.

7. The sodium enolate of 21-ethoxyoxalyl-3β-acetoxy-16,17-oxido-5-pregnene-20-one.

8. 21 - ethoxyoxalyl - 3β - acetoxy - 16,17 - oxido - 5-pregnene-20-one.

9. The potassium enolate of 21-ethoxyoxalyl-3β-acetoxy-16,17-oxido-5-pregnene-20-one.

10. The sodium enolate of 21-ethoxyoxalyl-3β-hydroxy-16,17-oxido-5-pregnene-20-one.

References Cited in the file of this patent
UNITED STATES PATENTS

| | | |
|---|---|---|
| 2,265,417 | Bockmuhl | Dec. 9, 1941 |
| 2,554,473 | Ruschig | May 22, 1951 |

FOREIGN PATENTS

| | | |
|---|---|---|
| 891,441 | France | 1944 |